United States Patent
Lee et al.

(10) Patent No.: US 12,488,940 B2
(45) Date of Patent: Dec. 2, 2025

(54) ELECTRONIC DEVICE INCLUDING DIELECTRIC LAYER AND METHOD OF MANUFACTURING THE ELECTRONIC DEVICE

(71) Applicant: Samsung Electronics Co., Ltd., Suwon-si (KR)

(72) Inventors: Woochul Lee, Suwon-si (KR); Cheheung Kim, Suwon-si (KR); Jiwoon Park, Suwon-si (KR); Jooho Lee, Suwon-si (KR); Hojin Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 100 days.

(21) Appl. No.: 18/479,747

(22) Filed: Oct. 2, 2023

(65) Prior Publication Data
US 2024/0170214 A1    May 23, 2024

(30) Foreign Application Priority Data
Nov. 22, 2022   (KR) .................. 10-2022-0157507

(51) Int. Cl.
*H01G 4/12*      (2006.01)
*H01G 4/008*     (2006.01)
*H01G 4/30*      (2006.01)

(52) U.S. Cl.
CPC .......... *H01G 4/1218* (2013.01); *H01G 4/008* (2013.01); *H01G 4/306* (2013.01)

(58) Field of Classification Search
CPC .......... H10D 1/68; H10D 1/684; H10D 1/692; H01G 4/1218; H01G 4/008; H01G 4/306;

(Continued)

(56) References Cited

U.S. PATENT DOCUMENTS 8,679,939 B2   3/2014   Malhotra et al.
8,766,404 B1*  7/2014   Barabash .......... H01L 21/02186
                                                        257/E29.342

(Continued)

FOREIGN PATENT DOCUMENTS

CN     101186496 A      5/2008
EP     2583945 A1 *     4/2013   ........... A61B 5/0059

(Continued)

OTHER PUBLICATIONS

Nicholas Johnson et al., "WO3 and W Thermal Atomic Layer Etching Using 'Conversion-Fluorination' and 'Oxidation-Conversion-Fluorination' Mechanisms", ACS Applied Materials & Interfaces, 9(39), pp. 34435-34447, Sep. 6, 2017.

(Continued)

*Primary Examiner* — Dion R. Ferguson
(74) *Attorney, Agent, or Firm* — Harness, Dickey & Pierce, P.L.C.

(57) ABSTRACT

An electronic device and a manufacturing method including a dielectric layer according to at least some embodiments are disclosed. The electronic device includes a first electrode, a second electrode spaced apart from the first electrode, a first dielectric layer between the first electrode and the second electrode, a second dielectric layer having a rutile phase, a third dielectric layer between the first dielectric layer and the second electrode, and a third dielectric layer between the second dielectric layer and the second electrode and including a material having a higher energy bandgap than a material included in the second dielectric layer.

19 Claims, 11 Drawing Sheets

(58) Field of Classification Search
CPC ........ H01G 4/085; H01G 4/10; H01G 4/1272; H01G 4/20; H01G 4/33; H10B 12/00; H10B 12/31; H10B 12/033
See application file for complete search history.

(56) References Cited

U.S. PATENT DOCUMENTS

| | | | |
|---|---|---|---|
| 8,772,123 B2 * | 7/2014 | Chen | H10D 1/68 257/E29.079 |
| 8,829,647 B2 | 9/2014 | Chen et al. | |
| 10,043,655 B2 | 8/2018 | Swaminathan et al. | |
| 10,186,570 B2 | 1/2019 | Hendrix et al. | |
| 2005/0152094 A1 * | 7/2005 | Jeong | H01G 4/10 361/312 |
| 2009/0289327 A1 | 11/2009 | Fujiwara | |
| 2010/0172065 A1 * | 7/2010 | Huang | H10D 1/68 361/313 |
| 2012/0119327 A1 | 5/2012 | Kwon et al. | |
| 2012/0309163 A1 | 12/2012 | Kiyomura et al. | |
| 2013/0071987 A1 * | 3/2013 | Chen | H01L 21/02178 438/396 |
| 2013/0100577 A1 | 4/2013 | Popovici | |
| 2013/0330903 A1 * | 12/2013 | Malhotra | H10D 1/692 438/396 |
| 2014/0185182 A1 * | 7/2014 | Hsieh | H01L 21/02271 361/301.4 |
| 2017/0186757 A1 * | 6/2017 | Tao | H10N 70/841 |
| 2019/0148067 A1 | 5/2019 | Hirata | |
| 2019/0148390 A1 | 5/2019 | Frank | |
| 2019/0165088 A1 * | 5/2019 | Cho | H01L 21/02672 |
| 2019/0267383 A1 | 8/2019 | Rocklein et al. | |
| 2019/0355806 A1 * | 11/2019 | Kang et al. | |
| 2020/0020780 A1 | 1/2020 | Kim | |
| 2020/0091278 A1 * | 3/2020 | Jung | H01L 21/02356 |
| 2020/0312952 A1 | 10/2020 | Cho et al. | |
| 2020/0321472 A1 | 10/2020 | Ramamoorthy et al. | |
| 2022/0102481 A1 * | 3/2022 | Du | H10D 1/692 |
| 2022/0115496 A1 * | 4/2022 | Park | H10D 1/68 |
| 2023/0163188 A1 * | 5/2023 | Lee | H10D 1/68 257/411 |
| 2024/0170214 A1 * | 5/2024 | Lee | H01G 4/10 |

FOREIGN PATENT DOCUMENTS

| | | | |
|---|---|---|---|
| JP | 2009-283850 A | | 12/2009 |
| JP | 2012-248813 A | | 12/2012 |
| JP | 5385723 B2 | | 1/2014 |
| KR | 20070024762 A | * | 3/2007 |
| KR | 20070111640 A | * | 11/2007 |
| KR | 20080029626 A | * | 4/2008 |
| KR | 20130123183 A | * | 11/2013 |
| KR | 20200033013 A | * | 3/2020 |
| KR | 20240056204 A | * | 4/2024 |

OTHER PUBLICATIONS

Soon Hyung Cha et al., "Scaling the Equivalent Oxide Thickness by Employing a TiO2 Thin Film on a Zro2-Al2O3 Based Dielectric for Further Scaling of Dynamic Random Access Memory", Phys. Status Solidi RRL 2019, 13, 1900282, Jul. 22, 2019.

Seong Keun Kim et al., "Al-Doped TiO2 Films with Ultralow Leakage Currents for Next Generation DRAM Capacitors", Adv. Mater. 2008, 20, pp. 1429-1435, Mar. 20, 2008.

Dae Seon Kwon et al., "Improved Properties of the Atomic Layer Deposited Ru Electrode for Dynamic Random-Access Memory Capacitor Using Discrete Feeding Method", ACS applied materials & interfaces 13.20, pp. 23915-23927, May 16, 2021.

Cheol Jin Cho et al., "Atomic layer deposition of Ta-doped SnO2 films with enhanced dopant distribution for thermally stable capacitor electrode applications", Applied Surface Science 497 (2019) 143804, Aug. 25, 2019.

Dong-Kwon Lee et al., "Growth of rutile-TiO2 thin films via Sn doping and insertion of ultra-thin SnO2 interlayer by atomic layer deposition", Materials Letters 246 (2019) 1-4, Mar. 9, 2019.

Seong Keun Kim et al., "Atomic layer deposition of TiO2 and Al-doped TiO2 films on Ir substrates for ultralow leakage currents", Phys. Status Solidi RRL 5, No. 8, 262-264 (2011), Jun. 17, 2011.

* cited by examiner

FIG. 2E heat treatment

ELECTRONIC DEVICE INCLUDING DIELECTRIC LAYER AND METHOD OF MANUFACTURING THE ELECTRONIC DEVICE

CROSS-REFERENCE TO RELATED APPLICATION

This application is based on and claims priority under 35 U.S.C. § 119 to Korean Patent Application No. 10-2022-0157507, filed on Nov. 22, 2022, in the Korean Intellectual Property Office, the disclosure of which is incorporated by reference herein in its entirety.

BACKGROUND

1. Field

The disclosure relates to an electronic device including a dielectric layer and a method of manufacturing the electronic device.

2. Description of the Related Art

In an environment in which the degree of integration of electronic devices increases, line widths and thicknesses of layers constituting electronic and/or semiconductor devices are reduced. When a thickness of a dielectric layer used in an electronic device and/or a memory device (e.g., DRAM) is reduced, a leakage current characteristic may be lowered, and thus, the operational reliability of the memory device may be lowered. Therefore, in the case of a dielectric layer used in a memory device, an appropriate permittivity and low leakage current are required while maintaining a small thickness of the memory device.

SUMMARY

Provided is an electronic device including a dielectric layer and a method of manufacturing the electronic device.

Additional aspects will be set forth in part in the description which follows and, in part, will be apparent from the description, or may be learned by practice of the presented embodiments of the disclosure.

According to an aspect of at least one embodiment, an electronic device includes a first electrode, a second electrode spaced apart from the first electrode, a first dielectric layer between the first electrode and the second electrode; a second dielectric layer between the first dielectric layer and the second electrode, the second dielectric layer having a rutile phase; and a third dielectric layer between the second dielectric layer and the second electrode, at least one of the first dielectric layer and the third dielectric layer includes a material having a greater energy bandgap than a material included in the second dielectric layer.

The second dielectric layer may include titanium oxide having the rutile phase.

The first electrode may include titanium nitride.

The rutile phase of the second dielectric layer may include a c-axis crystal direction parallel to a thickness direction of the second dielectric layer, a content of the rutile phase including the c-axis crystal direction parallel to the thickness direction is greater than a content of the rutile phase including the a-axis crystal direction parallel to the thickness direction.

The rutile phase of the second dielectric layer may include an a-axis crystal direction parallel to the thickness direction of the second dielectric layer.

A dielectric constant of the second dielectric layer may be 80 or more.

The first dielectric layer and the third dielectric layer may each include at least one of zirconium oxide, hafnium oxide, and zirconium-hafnium oxide.

At least one of the first dielectric layer or the third dielectric layer may include at least one of a tetragonal material and an orthorhombic material.

The second electrode may have a rutile phase.

The material included in the second dielectric layer may have an energy band gap of 3.0 eV or less, and the material included in the first dielectric layer may have an energy band gap greater than 3.0 cV.

According to an aspect of at least one embodiment, a method of manufacturing an electronic device, the method includes sequentially forming a first dielectric layer and a second dielectric layer on a first electrode, forming a third electrode on the second dielectric layer, and crystallizing the second dielectric layer into a rutile phase by heat treating of the first electrode, the first dielectric layer, the second dielectric layer, and the third electrode.

The method may further include removing the third electrode.

The method may further include sequentially forming a third dielectric layer and a second electrode on the second dielectric layer having a rutile phase.

The second dielectric layer may include at least one of zirconium oxide, hafnium oxide, and zirconium-hafnium oxide.

The second dielectric layer may include titanium oxide.

The forming of the second dielectric layer may be performed at a temperature of less than 300° C.

The heat treating of the first electrode, the first dielectric layer, the second dielectric layer, and the third electrode may be performed at a temperature in a range from 400° C. to 700° C.

The second electrode may include at least one of titanium nitride, ruthenium oxide, and iridium oxide.

The first electrode may include titanium nitride.

The material included in the second dielectric layer comprises a material having an energy band gap of about 3.0 eV or less, and the first dielectric layer comprises a material having an energy band gap greater than about 3.0 eV.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

Hereinafter, when an element or layer is referred to as being "on" or "above" another element or layer, the element or layer may include not only the element being "immediately on/under/left/right in a contact manner" but also being "on/under/left/right in a non-contact manner" unless expressly indicated otherwise. The singular forms are intended to include the plural forms as well unless the context clearly indicates otherwise. It should be understood that, when a part "comprises" or "includes" an element in the specification, unless otherwise defined, other elements are not excluded from the part and the part may further include other elements.

Further the terms "on," "above." "upper," and similar directional terms may be applied to both singular and plural. In addition, it will be understood that these, and other similar, directional terms are intended to encompass different orientations in addition to the orientation depicted in the figures. For example, if the device in the figures is otherwise oriented (e.g., rotated 90 degrees or at other orientations), the directional descriptors used herein are to be interpreted accordingly. With respect to operations that constitute a method, the operations may be performed in any appropriate sequence unless the sequence of operations is clearly described or unless the context clearly indicates otherwise.

Also, in the specification, the term " . . . unit" or " . . . module" denote unit or module that processes at least one function or operation and may be realized by processing circuitry such as hardware, software, or a combination of hardware and software. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like), etc.

Although the terms 'first', 'second', etc. may be used herein to describe various constituent elements, these constituent elements should not be limited by these terms. These terms are only used to distinguish one constituent element from another.

The connections of lines and connection members between constituent elements depicted in the drawings are examples of functional connection and/or physical or circuitry connections, and thus, in practical devices, may be expressed as replaceable or additional functional connections, physical connections, or circuitry connections.

All examples or example terms are simply used to explain in detail the technical scope of the inventive concepts, and thus, the scope of the inventive concepts are not limited by the examples or the example terms as long as it is not defined by the claims.

Figure 1:
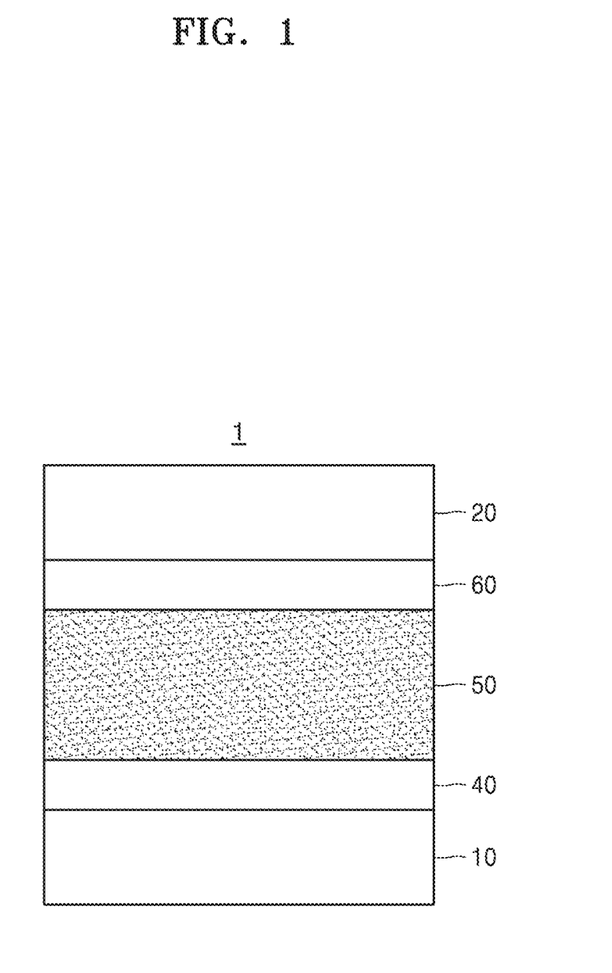
FIG. 1 is a diagram showing a structure of an electronic device according to at least one embodiment.

FIG. 1 is a diagram showing a structure of an electronic device 1 according to at least one embodiment.

The electronic device 1 according to at least one embodiment of FIG. 1 may include a capacitor 200 to be described later.

Referring to FIG. 1, the electronic device 1 includes a first electrode 10, a second electrode 20 spaced apart from the first electrode. The electronic device 1 includes a dielectric component including a first dielectric layer 40, a second dielectric layer 50, and a third dielectric layer 60 such that the first dielectric layer 40 is disposed between the first electrode 10 and the second electrode 20, the second dielectric layer 50 is disposed between the first dielectric layer 40 and the second electrode 20 and has a rutile phase, and the third dielectric layer 60 is disposed between the second dielectric layer 50 and the second electrode 20. At least one of the first and/or third dielectric layers 40 and 60 include a material having a higher energy bandgap than a material included in the second dielectric layer 50. In at least some embodiments, an insertion layer may be inserted into at least one of the first dielectric layer 40 to the third dielectric layer 60, but this will be described later.

The first electrode 10 may include a metal material, a conductive material (for example, TiN), and/or the like. The first electrode 10 may be disposed as a lower electrode of the capacitor 200, but the example embodiments are not necessarily limited thereto.

The second electrode 20 may include a metal material and/or a conductive material (such as preferably TiN, $RuO_2$, $IrO_2$, and/or the like). In at least some embodiments, the second electrode 20 may have a rutile phase, which will be described in detail below.

The second dielectric layer 50 having a rutile phase may be disposed between the first electrode 10 and the second electrode 20. In order to be applied as a dielectric layer of a capacitor as a component of an electronic device or a semiconductor device (for example, a DRAM) the dielectric layer is selected (or required) to satisfy both high permittivity and low leakage current characteristics at a small thickness (e.g., less than about 15 nm).

The second dielectric layer 50 may include titanium oxide (e.g., $TiO_2$) with the rutile phase. More specifically, the dielectric constant of titanium oxide may vary depending on a state of the phase.

For example, in at least some embodiments, the second dielectric layer 50 may have a permittivity of 80 or more. For example, when the second dielectric layer 50 includes $TiO_2$ having a rutile phase, the second dielectric layer 50 has an a-axis permittivity of about 90 and a c-axis permittivity of about 170. In contrast, when a comparative second dielectric layer is formed to have primarily an anatase phase, $TiO_2$ included in the comparative second dielectric layer may have a permittivity in a range of about 30 to about 40.

In at least some of the embodiments, all (or most) of the rutile phase of the second dielectric layer 50 may include a c-axis crystal direction parallel to a thickness direction of the second dielectric layer 50. For example, the c-axis crystal direction may be perpendicular to the surface on which the second dielectric layer 50 is deposited. In at least some embodiments, in the second dielectric layer 50, the content of crystal grains having a c-axis crystal direction parallel to the thickness direction of the second dielectric layer 50 is greater than the content of crystal grains having an a-axis crystal direction parallel to the thickness direction of the second dielectric layer 50. Because the second dielectric layer 50 includes a rutile phase with high permittivity, the capacitor may be stably operated. However, it may be noted that the content of crystal grains according to the crystal direction is not necessarily limited and the content may be varied.

The second dielectric layer 50 may have a configuration configured to reduce leakage current while stably maintaining a phase having a high dielectric constant and may be deposited on one surface of the first electrode 10. The one surface of the first electrode 10 may be an upper surface, but depending on the viewpoint of the electronic device 1 (or the structure of the capacitor 200 included in the electronic device 1), the one surface may be a side surface, a lower surface, an inclined surface, etc.

The first dielectric layer 40 may be disposed between the first electrode 10 and the second dielectric layer 50. The first dielectric layer 40 may include a material having a higher energy bandgap than the material included in the second dielectric layer 50. For example, when the energy bandgap of titanium oxide (e.g., $TiO_2$) included in the second dielectric layer 50 is greater than 0 eV and less than or equal to 3.0 eV, a material included in the first dielectric layer 40 may have an energy bandgap greater than 3.0 eV. The higher energy bandgap of the material included in the first dielectric layer 40 (compared to the material included in the second dielectric layer 50) reduces (or prevents) leakage current due to, e.g., $TiO_2$ having a low energy bandgap. The first dielectric layer 40 may include at least one of zirconium oxide, hafnium oxide, and/or zirconium-hafnium oxide. For example, the first dielectric layer 40 may include at least one of $ZrO_2$, $HfO_2$, $HfZrO_2$, $Al_2O_3$, $Ta_2O_5$, $Y_2O_3$, and/or the like. $ZrO_2$, $HfO_2$, and $HfZrO_2$ included in the first dielectric layer 40 may include at least one of a tetragonal material and/or an orthorhombic material. However, the example embodiments are not necessarily limited thereto.

The third dielectric layer 60 may be disposed between the second electrode 20 and the second dielectric layer 50. Like the first dielectric layer 40, the third dielectric layer 60 may include at least one of $ZrO_2$, $HfO_2$, and $HfZrO_2$. For example, the third dielectric layer 60 may include at least one of $ZrO_2$, $HfO_2$, $HfZrO_2$, $Al_2O_3$, $Ta_2O_5$, and/or $Y_2O_3$. Also, $ZrO_2$, $HfO_2$, and/or $HfZrO_2$ included in the third dielectric layer 60 may include at least one of a tetragonal material and/or an orthorhombic material. However, the example embodiments not necessarily limited thereto. The first dielectric layer 40 and the third dielectric layer 60 may include the same, or different materials.

The second electrode 20 having a rutile phase mentioned above may include at least one of a $RuO_2$ layer, an $IrO_2$ layer, a Ta doped $SnO_2$ layer, a Nb doped $SnO_2$ layer, a $PtO_2$ layer, a $PdO_2$ layer, a $ReO_2$ layer, a $MoO_2$, a $WO_2$ layer, a $TaO_2$ layer, a $NbO_2$ layer, and/or a TiN layer. For example, the second electrode 20 may include one layer and/or may be formed by sequentially stacking two or three layers selected from the above-listed materials having a rutile phase.

The second dielectric layer 50 may have a thickness greater than those of the first dielectric layer 40 and the third dielectric layer 60. For example, the first and third dielectric layers may have a thickness in a range from about 0.5 nm to about 5 nm; and the second dielectric layer 50 may have a thickness in a range from about 1 nm to about 10 nm, but the example embodiments are not necessarily limited thereto; and may have a small thickness to achieve a highly integrated semiconductor device.

FIGS. 2A to 2I are diagrams illustrating a method of manufacturing an electronic device according to at least one embodiment.

Figure 2A:
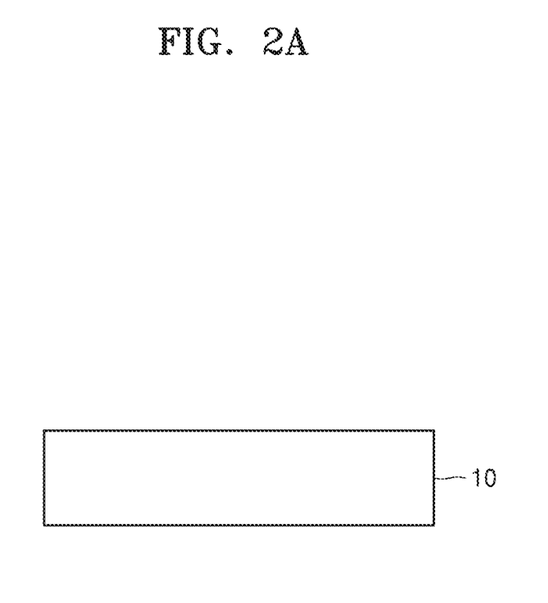
FIGS. 2A to 2I are diagrams illustrating a method of manufacturing an electronic device according to at least one embodiment.

Referring to FIG. 2A, a first electrode 10 may be formed. As described in FIG. 1, the first electrode 10 may include a metal material and/or a conductive material, for example TiN, but is not limited thereto.

In at least some embodiments, the first electrode 10 may be disposed as a lower electrode of a capacitor 200.

In at least some embodiments, the first electrode 10 may be formed by an atomic layer deposition (ALD) process. ALD is a nano-thin film deposition technology that uses a phenomenon of a monoatomic layer that is chemically attached during, e.g., a semiconductor manufacturing process, ultrafine layer-by-layer deposition with an atomic layer thickness is possible by alternately performing adsorption and displacement of molecules on a wafer surface, oxide and metal thin films may be stacked as thin as possible, and a film may be formed at a lower temperature (e.g., less than 500° C.) than a chemical vapor deposition (CVD) process in which particles formed by a chemical reaction of gases are deposited on the wafer surface, thus, is suitable for applying to a system-on-chip (SoC) process.

Figure 2B:
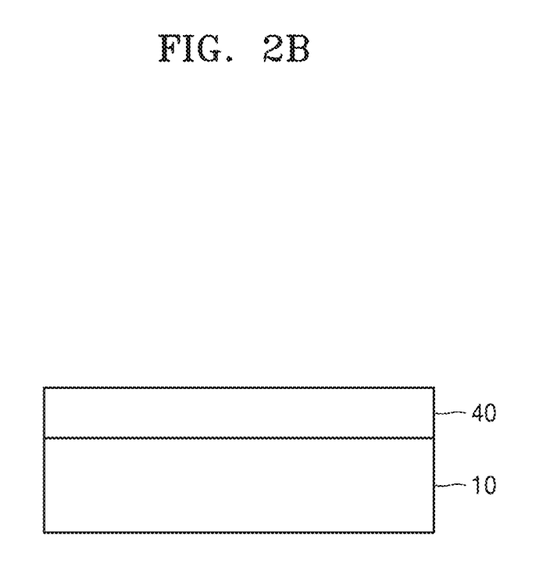

Referring to FIG. 2B, a first dielectric layer 40 may be formed on the first electrode 10.

In at least some embodiments, the first dielectric layer 40 may include at least one of $ZrO_2$, $HfO_2$, and $HfZrO_2$, but is not necessarily limited thereto. In at least some embodiments, the first dielectric layer 40 may include at least one of $ZrO_2$, $HfO_2$, and/or $HfZrO_2$ and at least one of $Al_2O_3$, $Ta_2O_5$, and/or $Y_2O_3$.

The first dielectric layer 40 may be formed by ALD, and the thickness of the first dielectric layer 40 may be in a range from about 5 Å (angstrom) to about 30 Å. 1 Å means 0.1 nm.

The first dielectric layer 40 may include a tetragonal material or an orthorhombic material, but is not necessarily limited thereto.

Figure 2C:
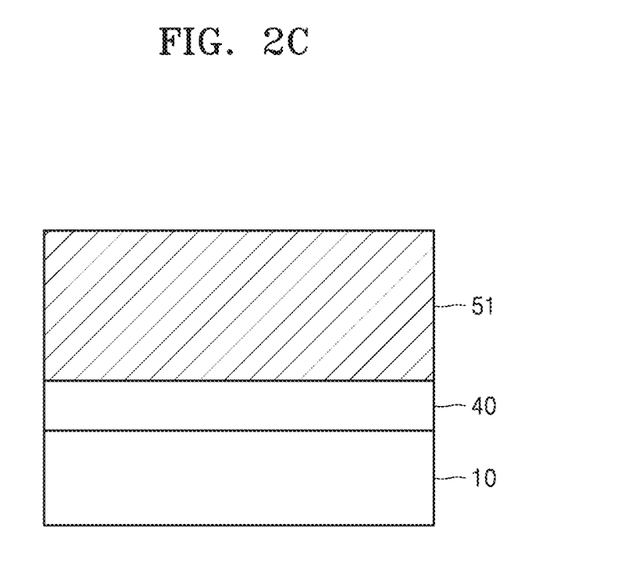

Referring to FIG. 2C, a second dielectric layer 51 may be formed on the first dielectric layer 40.

The second dielectric layer 51 may include titanium oxide, for example $TiO_2$. In addition, the operation of forming the second dielectric layer 51 having an amorphous phase on the first dielectric layer 40 may be performed at a temperature of less than 300° C. and may be of an amorphous phase but is not necessarily limited to the thereto.

The second dielectric layer 51 having an amorphous phase may be formed by, e.g., atomic layer deposition (ALD), to a thickness in a range from about 5 Å to about 40 Å.

Figure 2D:
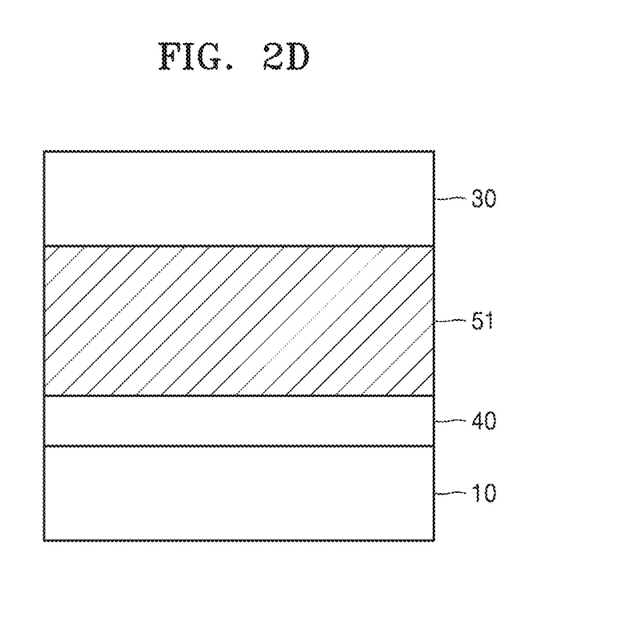

Referring to FIG. 2D, a third electrode 30 may be formed on the second dielectric layer 51.

The third electrode 30 may have a rutile phase but is not necessarily limited thereto.

The third electrode 30 having the rutile phase may include a metal material or a conductive material, including, e.g., at least one of titanium nitride, $RuO_2$, and/or $IrO_2$, but is not necessarily limited thereto.

The third electrode 30 having a rutile phase may be a sacrificial layer (or top template) disposed on the second dielectric layer 51. The sacrificial layer refers to a layer to be removed by an etching process after formation of a dielectric layer in the process of manufacturing an electronic device or capacitor. In this case, the etching process may include at least one of dry etching, wet etching, and/or atomic layer etching.

The third electrode 30 may include a semiconductor material and/or a metal material. The semiconductor material may include, e.g., $SnO_2$, and the metal material may include, e.g., TiN, $RuO_2$, or $IrO_2$, but is not necessarily limited thereto.

For example, when the third electrode 30 is a semiconductor material, the semiconductor material may be formed by ALD process. The deposition temperature of the third electrode 30 may be in a range from about 150° C. to about 400° C., but is not necessarily limited thereto.

The third electrode 30 may have a thickness in a range from about 5 Å to about 50 Å. When the third electrode 30 includes a semiconductor material, the third electrode 30 is removed (etched) after a dielectric layer is formed by an etching process, and a third dielectric layer (60 of FIG. 1) and a second electrode (20 of FIG. 1) may be deposited in the region where the third electrode 30 is removed. In this case, the second electrode may include titanium nitride or TiN, but is not necessarily limited thereto, which will be described in detail below.

When the third electrode 30 includes a metal material, the metal material may be formed by using an atomic layer deposition (ALD) process. The deposition temperature of the third electrode 30 may be in a range from about 150° C. to about 400° C. The thickness of the third electrode 30 including the metal material may be in a range from about 5 Å to about 50 Å.

When the third electrode 30 includes a metal material, unlike the case when the third electrode 30 includes a semiconductor material, the third electrode 30 may not be removed by etching, which will be described in detail later.

Figure 2E:
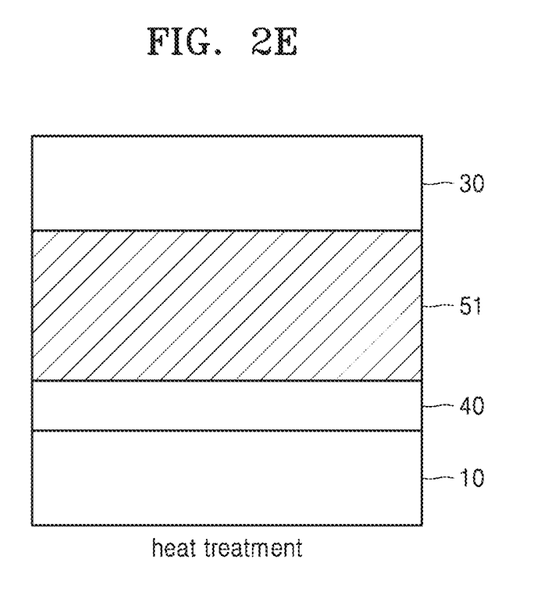

FIG. 2E is a diagram illustrating an operation of heat treatment of the first electrode 10, the first dielectric layer 40, the second dielectric layer 51, and the third electrode 30.

The operation of heat treatment of the first electrode 10, the first dielectric layer 40, the second dielectric layer 51, and the third electrode 30 may be performed at a temperature in a range from about 400° ° C. to about 700° C. but is not necessarily limited to the temperature range.

Through the operation of heat treatment of the first dielectric layer 40, the second dielectric layer 51, and the third electrode 30, the second dielectric layer 51 may be crystallized from, e.g., an amorphous to the rutile phase.

The second dielectric layer 50 having a rutile phase has a higher permittivity and a lower leakage current characteristic than the amorphous dielectric layer, thus, is more suitable to be applied as a capacitor dielectric layer of, e.g., a highly integrated semiconductor device.

Figure 2F:
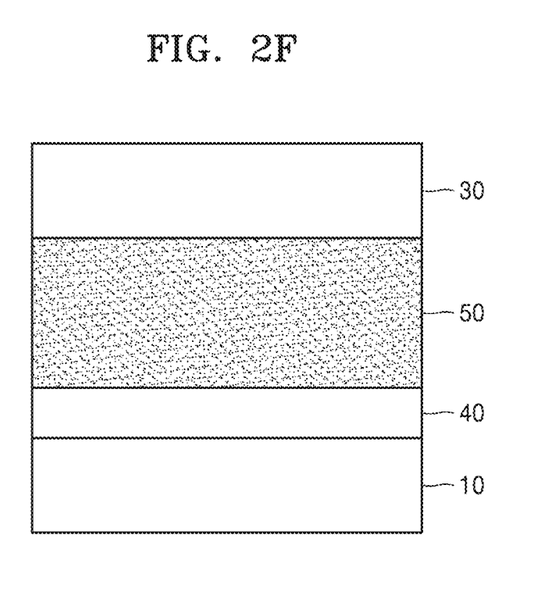

Referring to FIG. 2F, the first electrode 10, the second dielectric layer 50 having a rutile phase, the first dielectric layer 40, and the third electrode 30 are sequentially provided.

In the second dielectric layer 50, the content of crystal grains having a c-axis crystal direction parallel to a thickness direction of the second dielectric layer 50 may be greater than the content of crystal grains having an a-axis crystal direction parallel to the thickness direction of the second dielectric layer 50. However, the example embodiments are not necessarily limited thereto, and it should be noted that the content of crystal grains according to the crystal direction may be variously changed.

The second dielectric layer 50 including titanium oxide of a rutile phase may have a permittivity in a range from about 80 to about 100. However, the example embodiments are not necessarily limited thereto.

The structure of FIG. 2F may be used as an electronic device according to at least one embodiment. For example, when the third electrode 30 includes a metal material, the first electrode 10, the first dielectric layer 40, the second dielectric layer 50 having a rutile phase, and the third electrode 30 may be (or be included in) an electronic device. In at least some embodiments, the third electrode 30 may be removed and another electrode (e.g., the second electrode 20 of FIG. 1) may be formed.

Figure 2G:
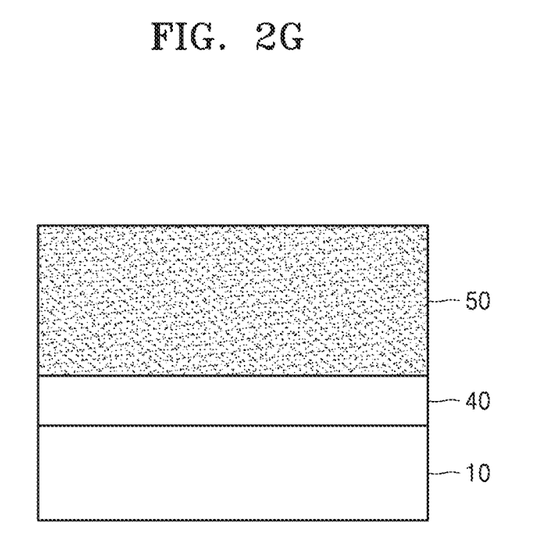

For example, FIG. 2G is a diagram showing that the third electrode 30 is removed by etching and the first electrode 10, the first dielectric layer 40, and the second dielectric layer 50 having a rutile phase are disposed.

As described above, the etching may include at least one of dry etching, wet etching, and atomic layer etching.

When the third electrode 30 includes a semiconductor material, after the second dielectric layer is crystallized to have a rutile phase through a heat treatment operation, the third electrode 30 is removed by etching, and the second electrode 20 is deposited.

Figure 2H:
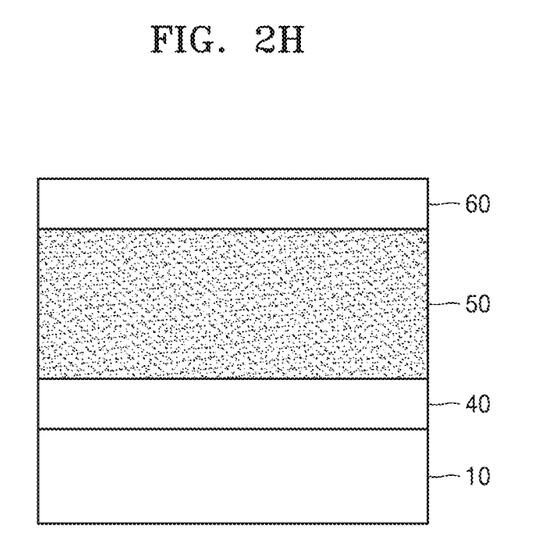

FIG. 2H is a view showing that a third dielectric layer 60 is formed on the second dielectric layer 50 having a rutile phase after the third electrode 30 is removed by etching.

The third dielectric layer 60 may include at least one of zirconium oxide, hafnium oxide, and zirconium-hafnium oxide, and the $ZrO_2$, $HfO_2$, and $HfZrO_2$ included in the third dielectric layer 60 may include at least one of a tetragonal material and/or an orthorhombic material. However, the example embodiments are not necessarily limited thereto.

Figure 2I:
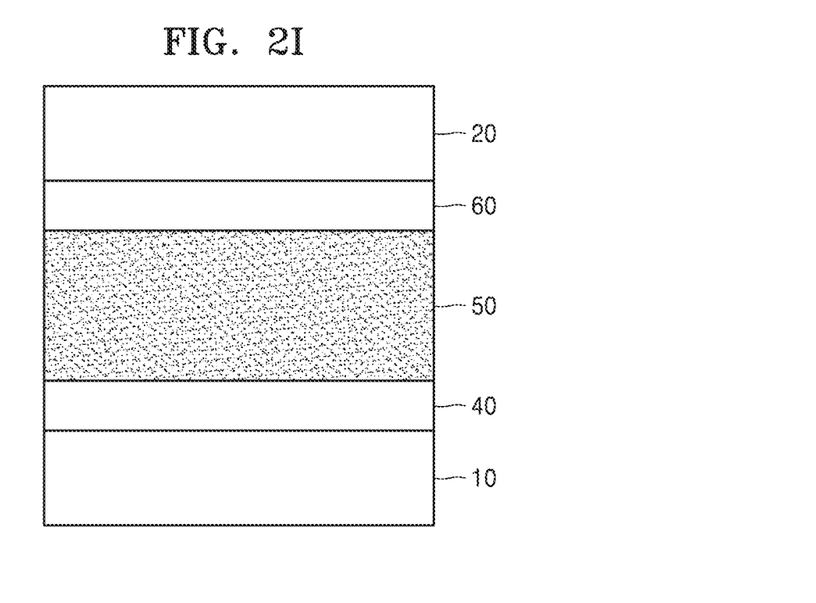

Referring to FIG. 2I, the second electrode 20 is formed on the third dielectric layer 60.

Like the first electrode 10 and the third electrode 30, the second electrode 20 may include a metal material or a conductive material, for example, titanium nitride, but is not necessarily limited thereto.

The second electrode 20 may be formed by using an atomic layer deposition (ALD) process. The deposition temperature of the second electrode 20 may be in a range from about 150° C. to about 400° C., but is not necessarily limited now. The thickness of the third electrode 30 may be in a range from about 5 Å to about 50 Å.

Figure 3:
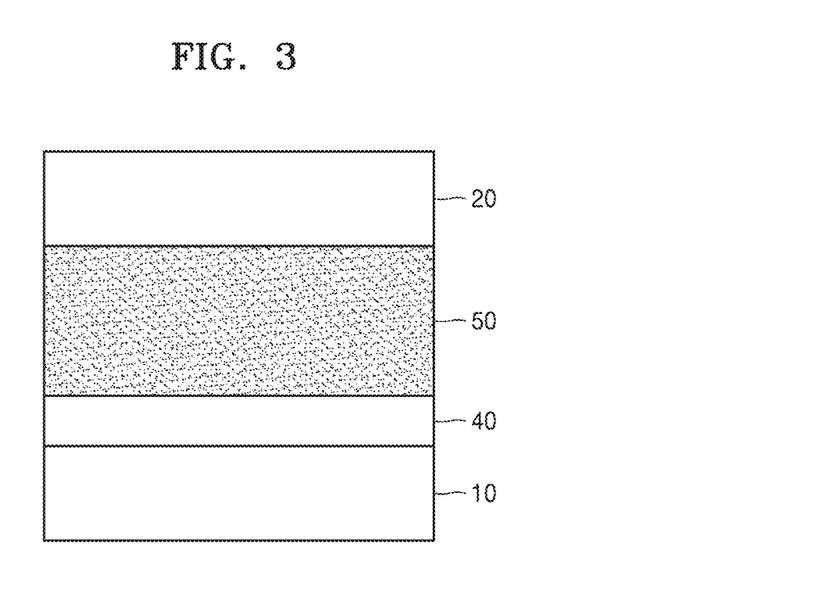
FIG. 3 is a diagram showing a structure of an electronic device according to at least one embodiment.

FIG. 3 is a diagram showing a structure of an electronic device according to at least some embodiments.

Referring to FIG. 3, the electronic device may include a first electrode 10, a first dielectric layer 40, a second dielectric layer 50 having a rutile phase, and a second electrode 20.

Comparing FIG. 1 with FIG. 3, the electronic device of FIG. 3 may not include the third dielectric layer 60 of FIG. 1. Meanwhile, an energy bandgap of the first dielectric layer 40 may be greater than that of the second dielectric layer 50, which may reduce and/or prevent leakage current between the second dielectric layer 50 and the first electrode 10.

Figure 4:
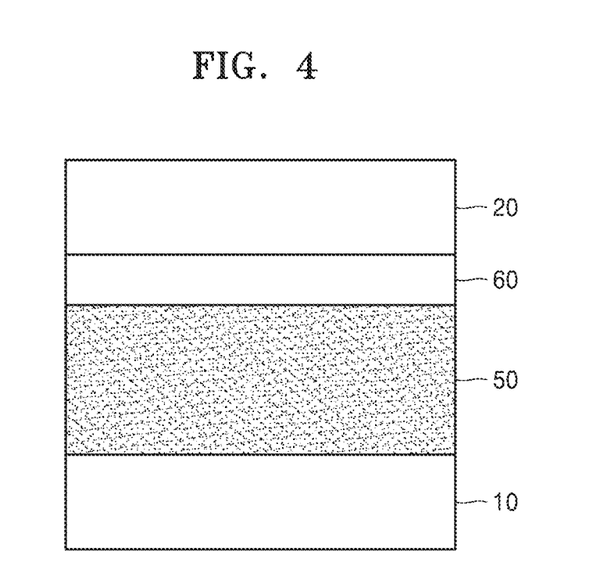
FIG. 4 is a diagram showing a structure of an electronic device according to at least one embodiment.

FIG. 4 is a diagram showing a structure of an electronic device according to at least one embodiment.

Referring to FIG. 4, the electronic device includes a first electrode 10, a second dielectric layer 50 having a rutile phase, a third dielectric layer 60, and a second electrode 20. Unlike the electronic device 1 described with reference to FIG. 1, the first dielectric layer 40 may not be formed.

Figure 5:
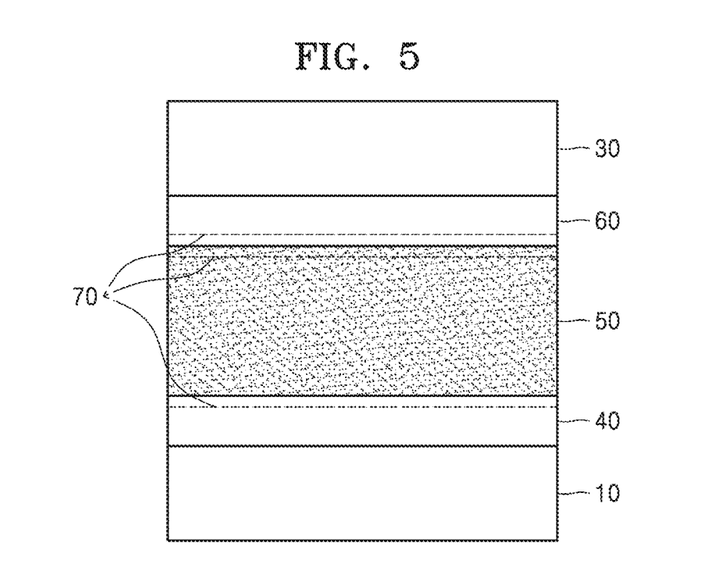
FIG. 5 is a diagram showing a structure of an electronic device according to at least one embodiment.

FIG. 5 is a diagram showing a structure of an electronic device according to at least one embodiment.

Referring to FIG. 5, it is shown that an insertion layer 70 is inserted into the structure of the electronic device 1 described in FIG. 1.

The insertion layer 70 may be formed between the first dielectric layer 40 and the third dielectric layer 60 and may solve a lattice constant mismatch of each layer. For example, a lattice constant of the insertion layer 70 may be between the lattice constants of the first dielectric layer 40 and the corresponding first or third dielectric layers 40 and 60 In addition, the permittivity of the electronic device may be improved through the insertion layer 70.

The insertion layer 70 may include, for example, at least one of $Al_2O_3$ and $Y_2O_3$, but is not necessarily limited thereto.

The insertion layer 70 may be formed by using an atomic layer deposition (ALD) process. The deposition temperature of the insertion layer 70 may be in a range from about 150° C. to about 400° C., but is not necessarily limited now. The thickness of the insertion layer 70 may be in a range from about 0 to about 5 Å.

Figure 6:
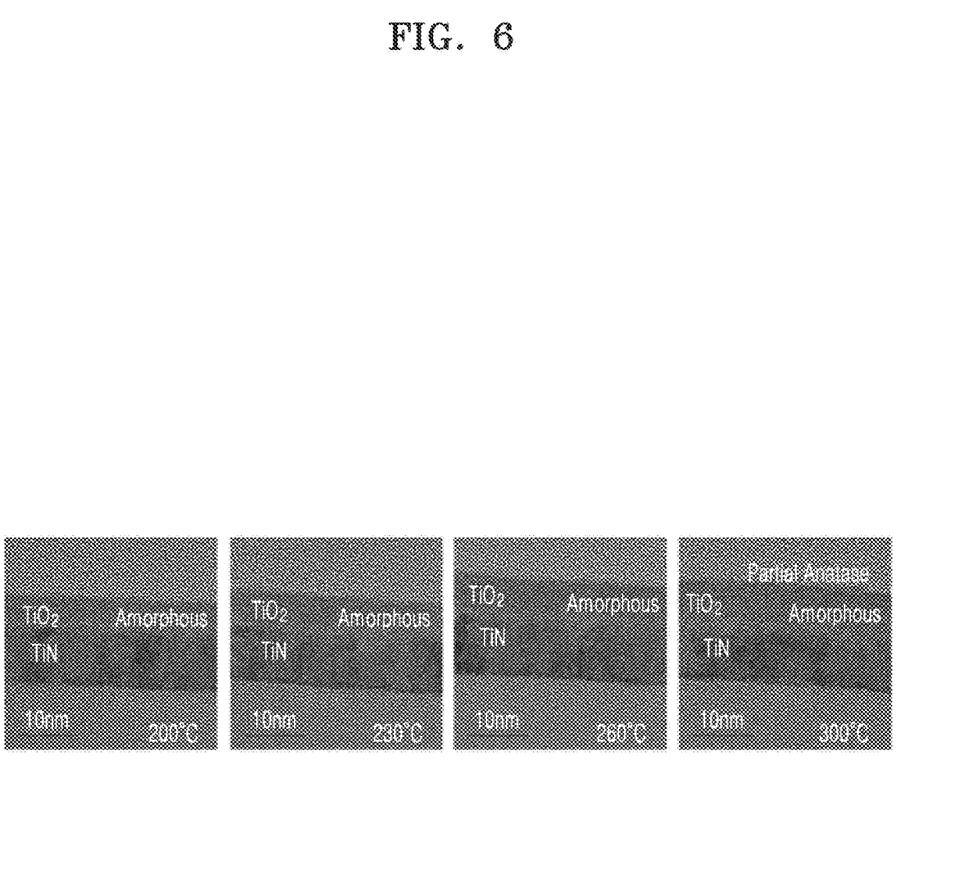
FIG. 6 is a diagram showing a structure for each temperature in an operation of forming a second dielectric layer.

FIG. 6 is a diagram showing a structure for each temperature in an operation of forming a second dielectric layer.

FIG. 6 shows crystals of the second dielectric layer according to the temperature at which the second dielectric layer is formed. As described above, the operation of forming the second dielectric layer having an amorphous phase on the first electrode must be performed at a temperature of less than 300° C. When the operation of forming the first dielectric layer having an amorphous phase is performed at 300° C. or higher, as shown in FIG. 6, a portion of $TiO_2$ included in the second dielectric layer is partially crystallized into an anatase phase, which, may serve as nucleation sites for further anatase crystal growth during the heat treatment, which is not well-matched for the requirements for a capacitor dielectric layer of a highly integrated semiconductor device. Further, the process to transition an anatase phase to the rutile phase requires more energy than the process to transition the amorphous phase to the rutile phase. Accordingly, the operation of forming the second dielectric layer having an amorphous phase on the first electrode may be performed at a temperature of less than 300° C.

Figure 7:
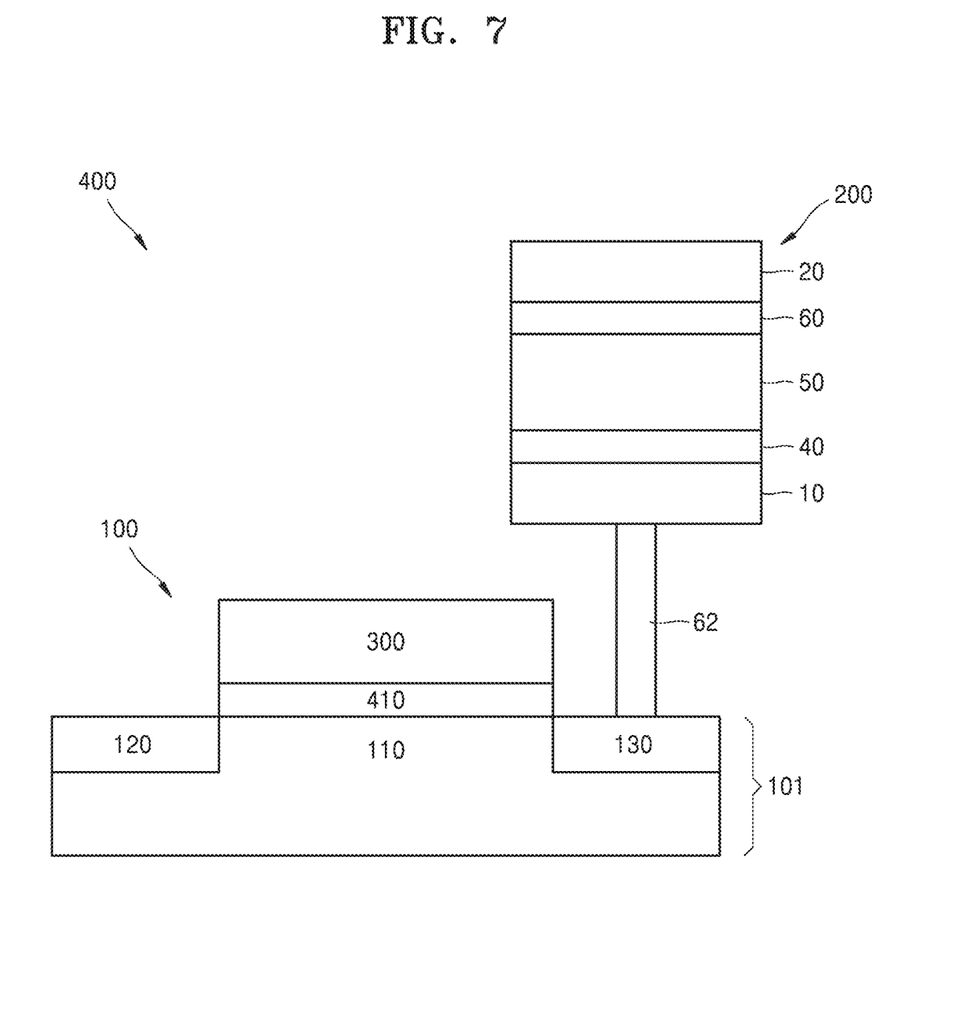
FIG. 7 is a schematic diagram showing a semiconductor device (a connection structure of an electronic device and a field effect transistor) according to at least one embodiment.

FIG. 7 is a schematic diagram showing a semiconductor device (a connection structure of a capacitor and a field effect transistor) according to at least one embodiment.

Referring to FIG. 7, a semiconductor device 400 may have a structure in which a capacitor 200 and a field effect transistor 100 are electrically connected by a contact 62. For example, one of the electrodes (10 or 20) of the capacitor 200 and one of source/drain 120 and 130 of the field effect transistors 100 may be electrically connected by a contact 62. The contact 62 may include any appropriate conductive material, such as tungsten, copper, aluminum, polysilicon, and/or the like. In at least some embodiments, the contact 62 may be omitted and the first electrode 10 may directly contact the drain 130. Though FIG. 7 is illustrated with electronic device 1 representing capacitor 200, the example embodiments are not limited thereto, and the capacitor 200 may be represented by, e.g., any of the above-mentioned embodiments.

The field effect transistor 100 includes a substrate 101 including a source 120, a drain 130, and a channel 110, and a gate electrode 300 disposed to face the channel 110. A dielectric layer 410 may further be included between the substrate 101 and the gate electrode 300.

The source 120 and the drain 130 may include a conductive material, and may each independently include a metal, a metal compound, or a conductive polymer. The substrate 101 may include a channel region 110, configured to allow charge carriers to flow between the source 120 and the drain 130 based on whether a charge is applied to the gate electrode 300. In at least some embodiments, channel region 110, the source 120, and/or the drain 130 may be formed by doping the source 120, and/or the drain 130 with a greater concentration and/or different type of dopant compared to the channel region 110 (and/or the remainder of the substrate 101). According to some embodiments, the source 120, and/or the drain 130 may include a metal (or metallic) contact.

The dispositions of the capacitor 200 and the field effect transistor 100 may be variously modified. For example, the capacitor 200 may be disposed on (or above) the substrate 101 and/or may have a structure buried in the substrate 101.

Semiconductor elements and semiconductor devices may be applied to various electronic devices. Specifically, the field effect transistor, the capacitor, or a combination thereof described above may be applied as a logic device or a memory device in various electronic devices. Semiconductor devices according to embodiments have advantages in terms of efficiency, speed, and power consumption, and may satisfy demands for miniaturization and integration of electronic devices. Specifically, semiconductor elements and semiconductor devices may be used for arithmetic operations, program execution, and temporary data retention in electronic devices such as mobile devices, computers, laptop computers, sensors, network devices, and neuromorphic devices. The semiconductor elements and semiconductor devices according to the embodiments may be useful for an electronic device in which a large amount of data is continuously transmitted.

Figure 8:
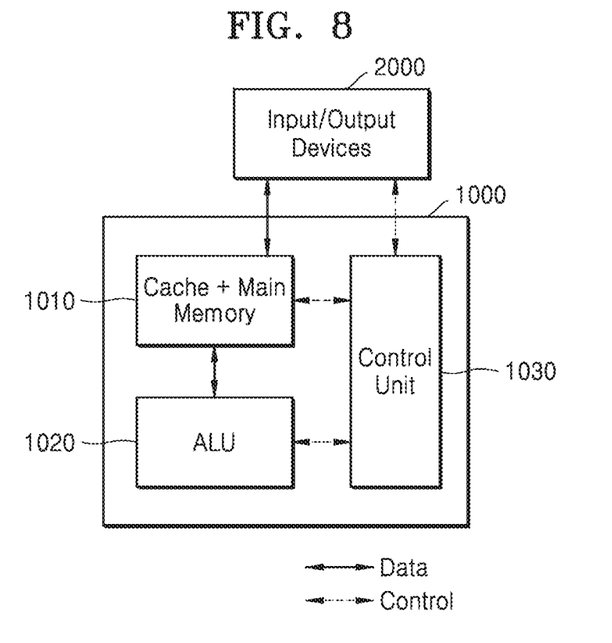
FIGS. 8 and 9 are conceptual diagrams schematically illustrating a device architecture applicable to an electronic device according to at least one embodiment.
Figure 9:
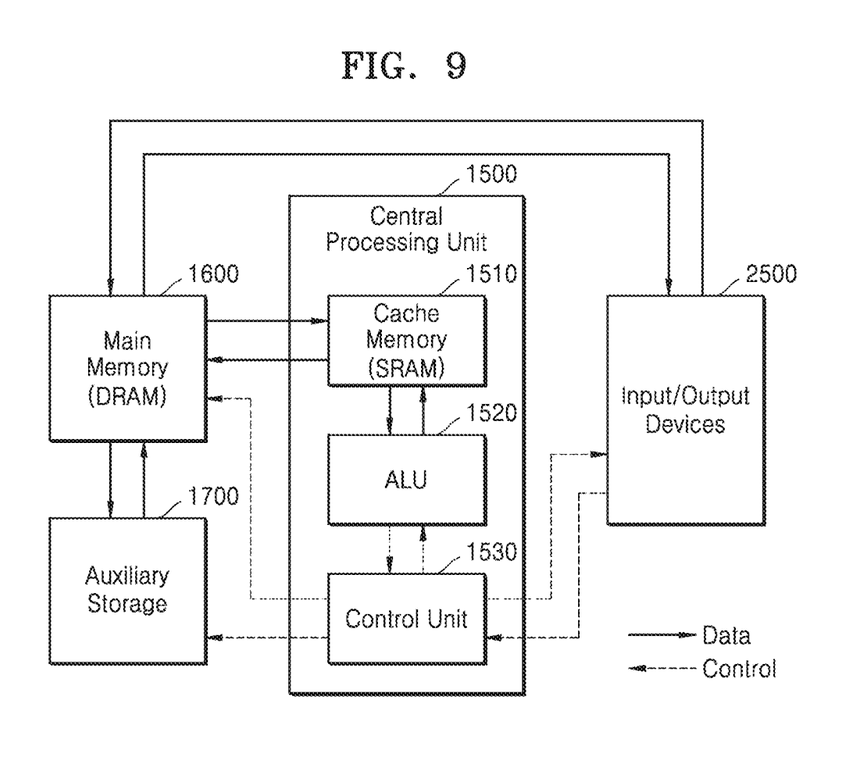

FIGS. 8 and 9 are conceptual views schematically illustrating an electronic device architecture applicable to an electronic device according to at least one embodiment.

Referring to FIG. 8, an electronic device architecture 1000 may include a memory unit 1010, an arithmetic logic unit (ALU) 1020, and a control unit 1030. The memory unit 1010, the ALU 1020, and the control unit 1030 may be electrically connected. For example, the memory unit 1010, the ALU 1020, and the control unit 1030 may be connected to each other through a metal line on an on-chip to communicate directly. In at least some embodiments, the electronic device architecture 1000 may be implemented as a single chip including the memory unit 1010, the ALU 1020, and the control unit 1030. The memory unit 1010, the ALU 1020, and the control unit 1030 may be monolithically integrated on one substrate to form one chip. The input/output device 2000 may be connected to the electronic device architecture (chip) 1000.

The memory unit 1010, the ALU 1020, and/or the control unit 1030 may independently include the above-described semiconductor devices (field effect transistors, capacitors, etc.). For example, the ALU 1020 and the control unit 1030 may each independently include the aforementioned field effect transistor, and the memory unit 1010 may include the aforementioned capacitor, field effect transistor, or a combination thereof. The memory unit 1010 may include both a main memory and a cache memory. The electronic device architecture (chip) 1000 may be an on-chip memory processing unit.

Referring to FIG. 9, a cache memory 1510, an ALU 1520, and a control unit 1530 may constitute a central processing unit (CPU) 1500. The cache memory 1510 may include static random-access memory (SRAM) and may include the field effect transistor described above. Separately from the CPU 1500, a main memory 1600 and an auxiliary storage 1700 may be provided. The main memory 1600 includes a dynamic random-access memory (DRAM) and may include the electronic device according to the embodiments described above.

In some cases, an electronic device architecture may be implemented in a form in which computing unit devices and memory unit devices are adjacent to each other in one chip without distinction of sub-units.

Figure 10:
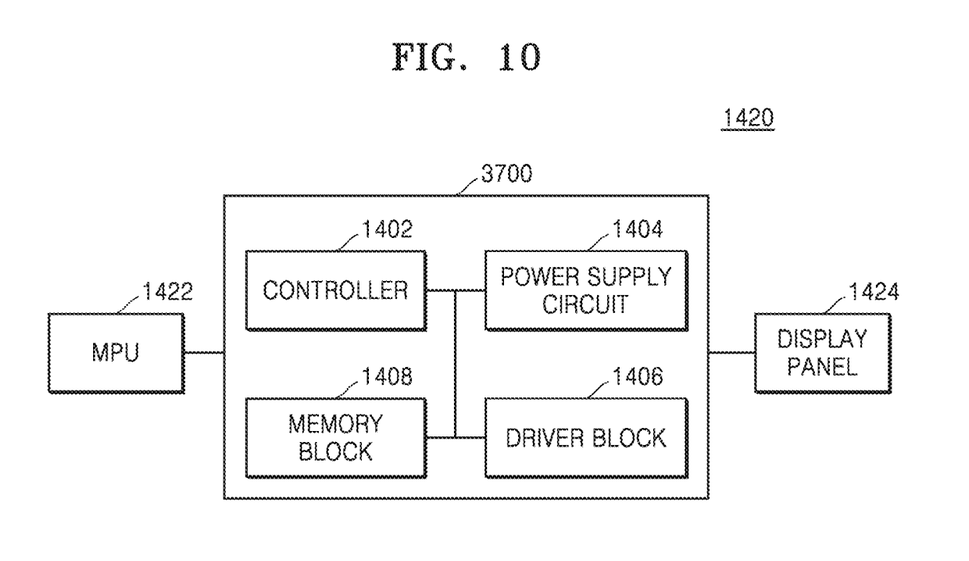
FIG. 10 is a schematic block diagram of a display driver integrated circuit (display driver IC: DDI) provided with an electronic device including a layer structure provided with a dielectric layer according to at least one embodiment and a display device including the DDI.

FIG. 10 is a schematic block diagram of a display driver integrated circuit (display driver IC: DDI) 3700 provided with an electronic device including a layer structure provided with a dielectric layer according to at least one embodiment and a display device 1420 including the DDI 3700.

Referring to FIG. 10, the DDI 3700 may include a controller 1402, a power supply circuit 1404, a driver block 1406, and a memory block 1408. The controller 1402 receives and decodes a command applied from the main processing unit (MPU) 1422 and controls each block of the DDI 3700 to implement an operation according to the command. The power supply circuit unit 1404 generates a driving voltage in response to the control of the controller 1402. The driver block 1406 drives a display panel 1424 using the driving voltage generated by the power supply circuit 1404 in response to the control of the controller 1402. The display panel 1424 may be a liquid crystal display panel or a plasma display panel. The memory block 1408 may be a block that temporarily stores commands input to the controller 1402 or control signals output from the controller 1402 or stores necessary data, and may include memory such as RAM and/or ROM. The power supply circuit 1404 and the driver block 1406 may include electronic devices according to the embodiments described above.

In addition, because the disclosed electronic device includes a rutile-phase second dielectric layer having a high permittivity and a third dielectric layer having a large energy bandgap, even in a highly integrated environment in which the thickness of the dielectric layer is reduced, for example, in an environment in which the thickness of the dielectric layer is reduced to 10 nm or less, it is possible to prevent a leakage current characteristic from deteriorating while maintaining the dielectric constant of the dielectric layer at a high dielectric constant.

Therefore, when a semiconductor device and an electronic device to which the disclosed dielectric layer is applied, operation characteristics may be stably maintained even in a high integration environment, and thus operation reliability of the device may be increased.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a first electrode;
   a second electrode spaced apart from the first electrode;
   a first dielectric layer between the first electrode and the second electrode;
   a second dielectric layer between the first dielectric layer and the second electrode, the second dielectric layer having a rutile phase; and
   a third dielectric layer between the second dielectric layer and the second electrode, at least one of the first dielectric layer or the third dielectric layer includes a material having an energy bandgap greater than an energy bandgap of a material included in the second dielectric layer,
   wherein a thickness of the second dielectric layer is greater than a thickness of the first dielectric layer and a thickness of the third dielectric layer.

2. The electronic device of claim 1, wherein the second dielectric layer includes titanium oxide having the rutile phase.

3. The electronic device of claim 1, wherein the first electrode includes titanium nitride.

4. The electronic device of claim 1, wherein the rutile phase of the second dielectric layer includes a c-axis crystal direction parallel to a thickness direction of the second dielectric layer.

5. The electronic device of claim 4, wherein the rutile phase of the second dielectric layer includes an a-axis crystal direction parallel to the thickness direction of the second dielectric layer, and
   a content of the rutile phase including the c-axis crystal direction parallel to the thickness direction is greater than a content of the rutile phase including the a-axis crystal direction parallel to the thickness direction.

6. The electronic device of claim 1, wherein a dielectric constant of the second dielectric layer is 80 or more.

7. The electronic device of claim 1, wherein the first dielectric layer and the third dielectric layer each include at least one of zirconium oxide, hafnium oxide, or zirconium-hafnium oxide.

8. The electronic device of claim 1, wherein at least one of the first dielectric layer or the third dielectric layer includes at least one of a tetragonal material and an orthorhombic material.

9. The electronic device of claim 1, wherein the second electrode has a rutile phase.

10. The electronic device of claim 1, wherein the energy bandgap of the material included in the second dielectric layer is 3.0 eV or less, and the energy bandgap of the material included in the first dielectric layer is greater than 3.0 eV.

11. A method of manufacturing an electronic device, the method comprising:
    sequentially forming a first dielectric layer and a second dielectric layer on a first electrode;
    forming a third electrode on the second dielectric layer;

crystallizing the second dielectric layer into a rutile phase by heat treating the first electrode, the first dielectric layer, the second dielectric layer, and the third electrode; and removing the third electrode.

12. The method of claim 11, further comprising:

sequentially forming a third dielectric layer and a second electrode on the second dielectric layer having the rutile phase.

13. The method of claim 12, wherein the second electrode includes at least one of titanium nitride, ruthenium oxide, or iridium oxide.

14. The method of claim 11, wherein the first dielectric layer includes at least one of zirconium oxide, hafnium oxide, or zirconium-hafnium oxide.

15. The method of claim 11, wherein the second dielectric layer includes titanium oxide.

16. The method of claim 11, wherein the forming of the second dielectric layer is performed at a temperature of less than 300° C.

17. The method of claim 11, wherein the heat treating of the first electrode, the first dielectric layer, the second dielectric layer, and the third electrode is performed at a temperature in a range from 400° C. to 700° C.

18. The method of claim 11, wherein the first electrode includes titanium nitride.

19. The method of claim 11, wherein the second dielectric layer comprises a material having an energy band gap of about 3.0 eV or less, and the first dielectric layer comprises a material having an energy band gap greater than about 3.0 eV.

* * * * *